United States Patent
Steele et al.

(10) Patent No.: US 10,635,822 B2
(45) Date of Patent: Apr. 28, 2020

(54) DATA INTEGRATION SYSTEM FOR TRIGGERING ANALYSIS OF CONNECTION OSCILLATIONS

(71) Applicant: BANK OF AMERICA CORPORATION, Charlotte, NC (US)

(72) Inventors: David Michael Steele, Carrollton, TX (US); Nelson John Chevis, Sr., Highland Village, TX (US); Jason Dean Vaughn, Jacksonville, FL (US); Allan Carlton Byers, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 287 days.

(21) Appl. No.: 15/827,515

(22) Filed: Nov. 30, 2017

(65) Prior Publication Data

US 2019/0163916 A1 May 30, 2019

(51) Int. Cl.
*G06F 21/57* (2013.01)
*G06F 21/64* (2013.01)
*H04L 29/06* (2006.01)

(52) U.S. Cl.
CPC ......... *G06F 21/577* (2013.01); *G06F 21/645* (2013.01); *H04L 63/1416* (2013.01); *G06F 2221/034* (2013.01); *G06F 2221/0782* (2013.01); *G06F 2221/2115* (2013.01)

(58) Field of Classification Search
CPC ... G06F 21/577; G06F 21/645; H04L 63/1416
See application file for complete search history.

(56) References Cited

U.S. PATENT DOCUMENTS

| 7,451,488 | B2* | 11/2008 | Cooper | H04L 63/102 726/2 |
| 8,020,210 | B2* | 9/2011 | Tippett | H04L 63/1416 726/23 |
| 8,230,280 | B2 | 7/2012 | Whetsel | |
| 8,353,045 | B2 | 1/2013 | Karabey et al. | |
| 8,392,431 | B1 | 3/2013 | Agassy et al. | |
| 8,402,546 | B2 | 3/2013 | Greenshpon et al. | |
| 8,418,249 | B1 | 4/2013 | Nucci et al. | |
| 8,438,644 | B2 | 5/2013 | Watters et al. | |

(Continued)

*Primary Examiner* — Ali S Abyaneh
*Assistant Examiner* — Shu Chun Gao
(74) *Attorney, Agent, or Firm* — Michael A. Springs; Moore & Van Allen PLLC; Nicholas C. Russell

(57) ABSTRACT

Embodiments of the present invention are directed to data integration and threat assessment for triggering analysis of connection oscillations in order to improve data and connection security. The invention leverages a security threat assessment engine and an analytics engine to gather and process data from a combination of internal and external data sources for a third party connection. The system continuously monitors and updates a generated threat level for a third party connection to determine changes or triggers indicating a potential security threat. In response to these determined changes or triggers, the system then responds to a detected security threat and minimizes damages resulting from data compromised by third party systems. Further, the system may extract and recover data from the third party systems and alter connection channels in order to further limit losses.

19 Claims, 4 Drawing Sheets

(56) References Cited

U.S. PATENT DOCUMENTS

| | | |
|---|---|---|
| 8,516,594 B2 | 8/2013 | Bennett et al. |
| 8,725,597 B2 | 5/2014 | Mauseth et al. |
| 8,744,894 B2 | 6/2014 | Christiansen et al. |
| 8,752,170 B1 | 6/2014 | Newstadt et al. |
| 9,130,937 B1 | 9/2015 | Ostermann et al. |
| 9,230,066 B1 | 1/2016 | Bailey et al. |
| 9,275,291 B2 | 3/2016 | Shulman et al. |
| 9,282,092 B1 | 3/2016 | Shankar et al. |
| 9,319,419 B2 | 4/2016 | Sprague et al. |
| 9,578,043 B2 | 2/2017 | Mawji et al. |
| 9,679,254 B1 | 6/2017 | Mawji et al. |
| 9,699,209 B2 | 7/2017 | Ng et al. |
| 9,721,296 B1 | 8/2017 | Chrapko |
| 10,491,627 B1 * | 11/2019 | Su .......................... G06F 21/56 |
| 2004/0044912 A1 * | 3/2004 | Connary ............... H04L 43/045 |
| | | 726/23 |
| 2005/0154601 A1 | 7/2005 | Halpern et al. |
| 2009/0024663 A1 | 1/2009 | McGovern |
| 2009/0123023 A1 | 5/2009 | Hein |
| 2009/0178139 A1 | 7/2009 | Stute et al. |
| 2013/0179761 A1 * | 7/2013 | Cho ..................... G06F 17/2235 |
| | | 715/202 |
| 2014/0357318 A1 * | 12/2014 | Li ........................... G06F 21/79 |
| | | 455/558 |
| 2015/0264077 A1 | 9/2015 | Berger et al. |
| 2016/0173524 A1 * | 6/2016 | Lietz ................... H04L 63/1433 |
| | | 726/25 |
| 2016/0371698 A1 | 12/2016 | Adler et al. |
| 2017/0063888 A1 * | 3/2017 | Muddu ................. H04L 43/062 |
| 2017/0140312 A1 | 5/2017 | Pai et al. |
| 2017/0223032 A1 * | 8/2017 | El-Moussa .......... H04L 63/0428 |
| 2017/0272472 A1 * | 9/2017 | Adhar ................. H04L 63/1425 |
| 2017/0310708 A1 | 10/2017 | Schiappa et al. |
| 2017/0339172 A1 * | 11/2017 | Mahadevia ......... H04L 63/1416 |
| 2017/0359370 A1 | 12/2017 | Humphries et al. |
| 2018/0084000 A1 * | 3/2018 | Baukes ............... H04L 63/1441 |
| 2018/0089449 A1 | 3/2018 | Boudreau et al. |
| 2018/0103055 A1 | 4/2018 | Keohane et al. |
| 2019/0066042 A1 * | 2/2019 | Conlon .................... H04K 3/00 |
| 2019/0081983 A1 * | 3/2019 | Teal ....................... G06F 21/55 |
| 2019/0173909 A1 * | 6/2019 | Mixer ................... H04L 41/142 |
| 2019/0260794 A1 * | 8/2019 | Woodford ........... G06F 3/04842 |

\* cited by examiner

DATA INTEGRATION SYSTEM FOR TRIGGERING ANALYSIS OF CONNECTION OSCILLATIONS

BACKGROUND

In the information security context, an entity may commonly rely on third parties, such as third party systems and applications, to operate at least a portion of its various processes. As a result, security issues and vulnerabilities which could compromise the third party, such as the third party systems and applications, may in turn create a security threat to the entity (e.g., the entity's systems or applications, processes, and/or data). Therefore, there is a need for a security threat assessment and monitoring tool to monitor and respond to threats originating from third party systems.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing a data integration and threat assessment system, computer program product, and computer-implemented method for triggering analysis of connection oscillations to improve data and connection security. The invention may be exampled by a system which defines a specific embodiment of the invention. The system typically comprises a threat assessment engine; a memory component; a communication component in communication with one or more external data sources via a network; and a processing component operatively coupled to the memory component and the communication component, wherein the processing component is configured to: pull internal data for a third party connection from one or more internal data sources; pull external data for the third party connection from the one or more external data sources; generate a threat level for the third party connection based on the internal data and the external data for the third party connection; monitor the threat level to determine a change in the threat level; and based on determining a change in the threat level, trigger transmission of an actionable alert to a user system.

In some embodiments, the processing component of the system is further configured for automatically placing a hold on the third party connection between a third party system and an entity system, wherein placing the hold on the third party connection further comprises terminating a data migration between a third party system and the entity system, wherein an operative communication channel between the third party system and the entity system is terminated. In some embodiments, placing the hold on the third party connection further comprises revoking access to data associated with the entity by the third party system. In still other embodiments, placing the hold on the third party connection is executed in response to detecting a cyber-attack on the third party system.

In some embodiments, the processing component of the system is further configured for automatically transmitting a request to extract entity data at least partially stored on the third party system in response to determining the change in the threat level, wherein the entity data at least partially stored on the third party system is removed from the third party system.

In some embodiments, determining the change in the threat level further comprises the threat level exceeding a predetermined value, wherein the transmission of the actionable alert is triggered upon the predetermined value being exceeded threat level passing a threshold to trigger. Additionally, in some embodiments, access to the entity data by the third party system is reinstated based on the threat level falling below the predetermined value.

In some embodiments, determining a change in the threat level further comprises identifying one or more anomalies associated with the third party connection, wherein the one or more anomalies are based on historical data associated with the third party connection, wherein current data and the historical data are displayed to a user in real time. In some embodiments, determining the change in the threat level is based on determining a change in at least one of the internal data and the external data. Furthermore, in some embodiments, the threat level is regularly updated based on current internal data and external data for the third party connection. In one embodiment, the threat level is updated daily based on changes in the internal data and external data for the third party connection.

In some embodiments, triggering the transmission of the actionable alert to an entity system further comprises generating a threat assessment report, wherein the threat assessment report displays current and historical information associated with the third party connection in real-time. In some embodiments, the threat assessment report further comprises a drill down graphic user interface.

In some embodiments, the actionable alert is transmitted to an assessment team associated with the entity responding to the change in the threat level.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
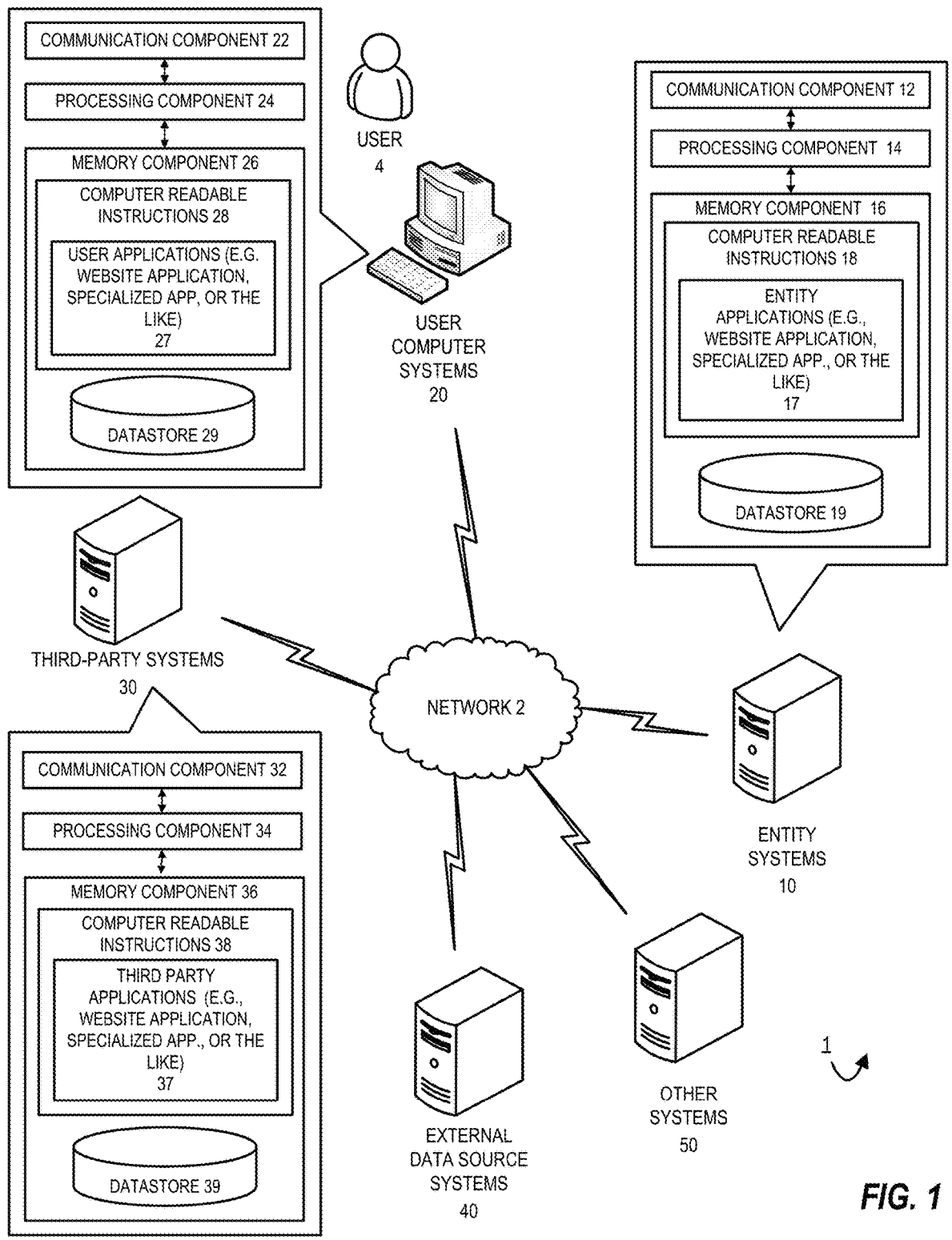
Figure 2:
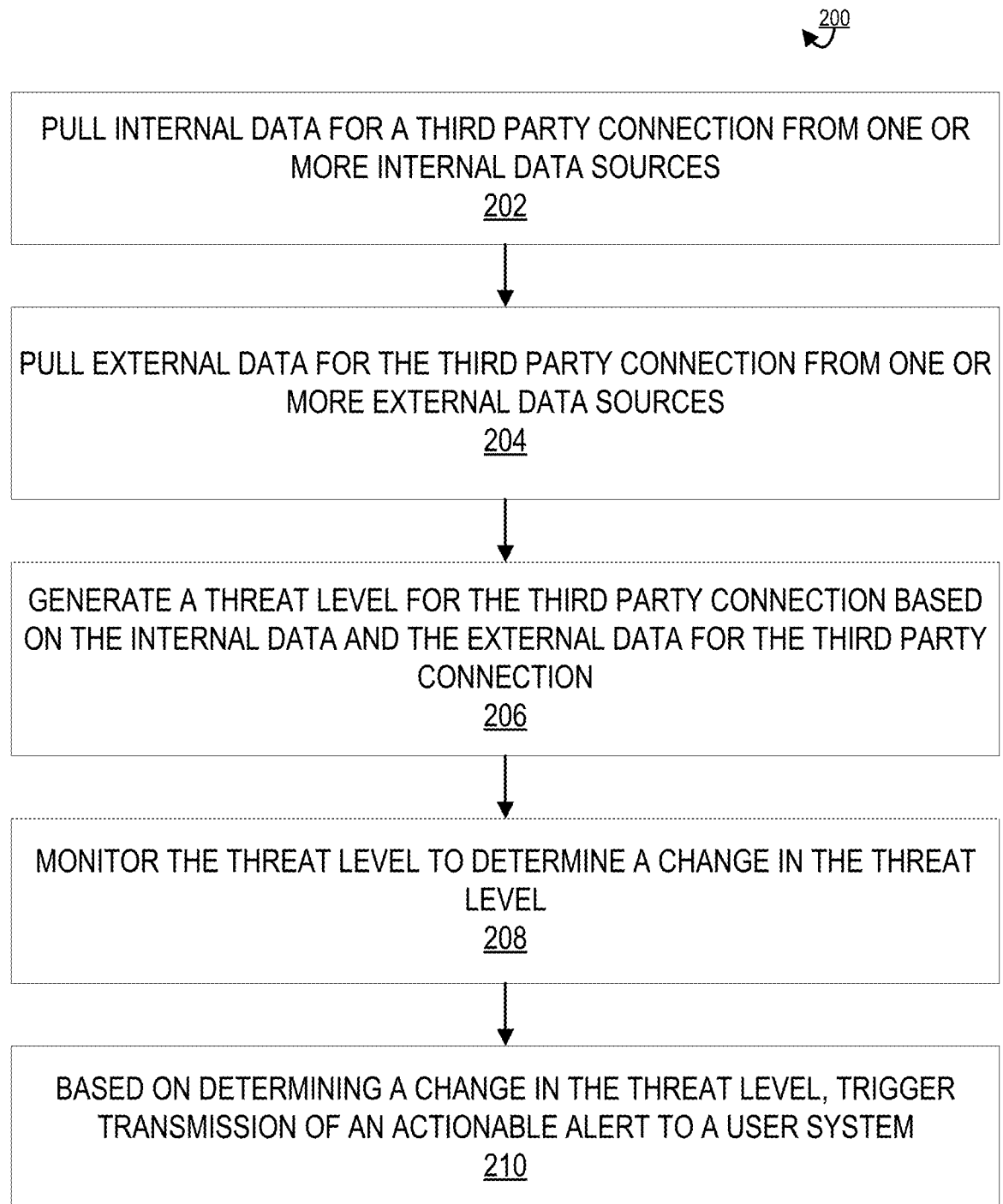
Figure 3:
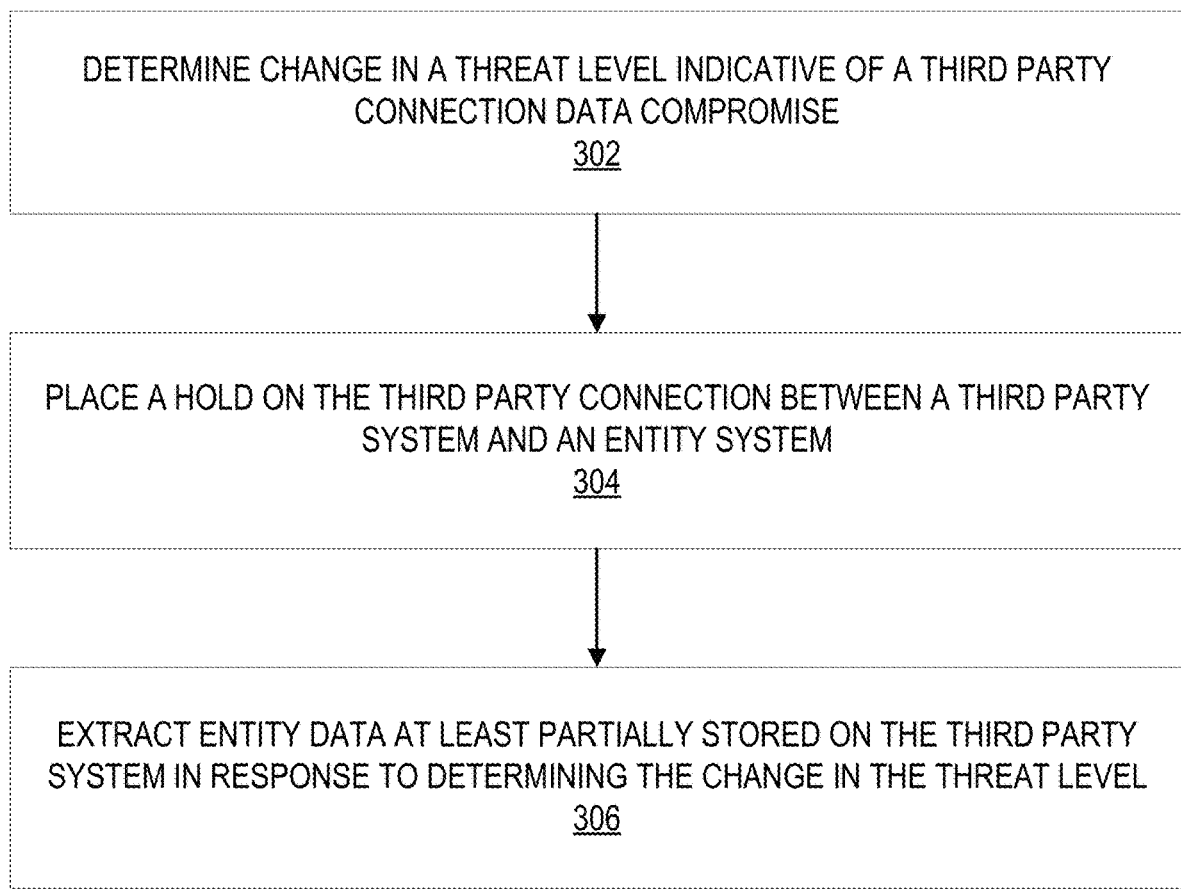
Figure 4:
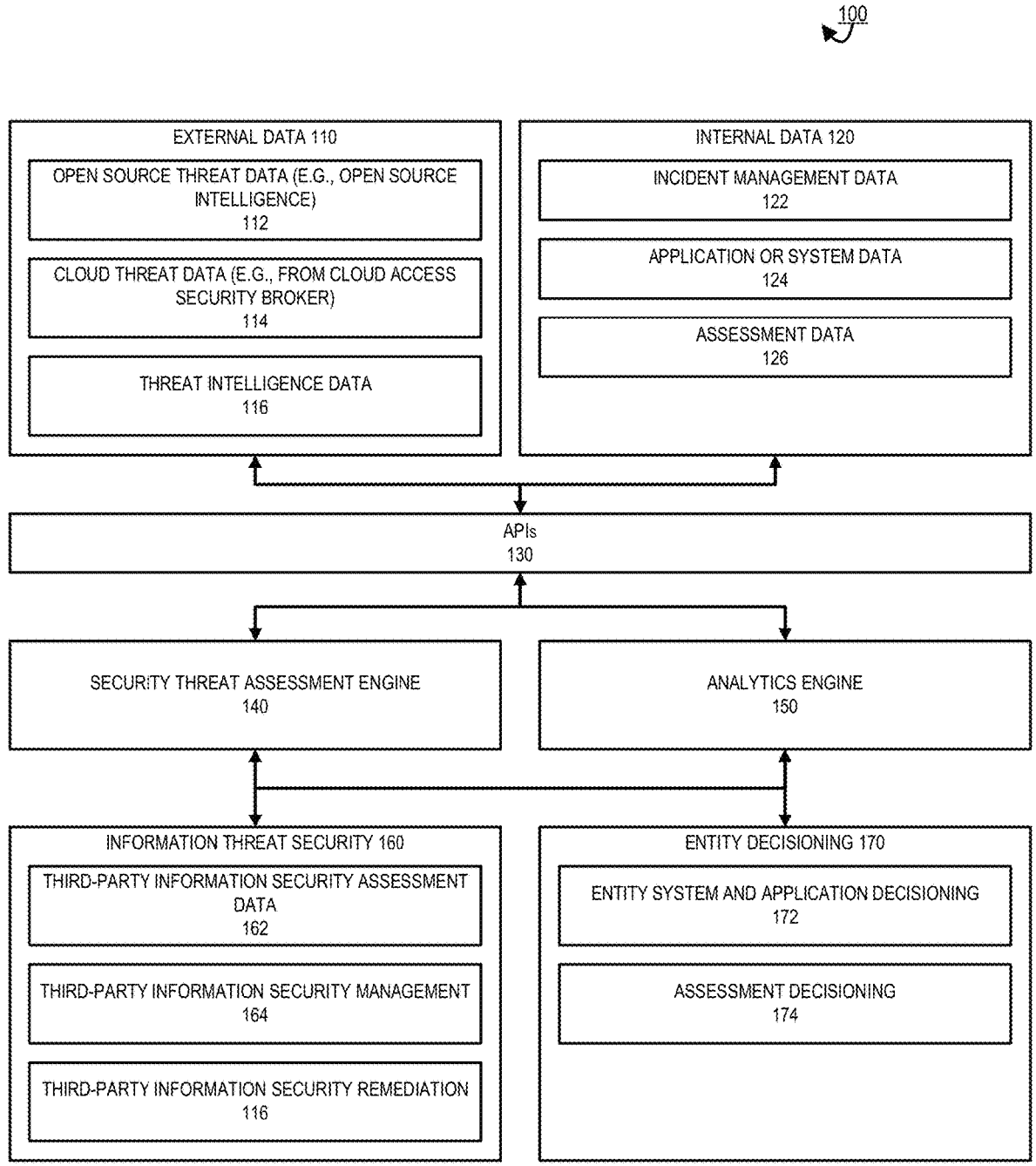

Having thus described embodiments of the invention in general terms, reference will now be made the accompanying drawings, wherein:

FIG. 1 provides a block diagram illustrating a data integration and threat assessment system and environment, in accordance with an embodiment of the invention;

FIG. 2 provides a high level process flow for triggering security threat responses based on data monitoring, in accordance with an embodiment of the invention;

FIG. 3 provides a high level process flow for placing a hold on a third party connection based on a determined security threat, in accordance with an embodiment of the invention; and FIG. 4 illustrates a flow of information to and from the security threat assessment engine and the analytics engine, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

A "user" as used herein may refer to any entity or individual associated with the data integration and threat assessment system. In some embodiments, a user may be a computing device user, a phone user, a mobile device application user, a financial institution customer (e.g., an account holder or a person who has an account (e.g., banking account, credit account, or the like)), a system operator, database manager, a helpdesk support technician, and/or employee of an entity. For example, a user may be a user of a computer system or device that attempting to connect and interact with an entity, while another user may be a helpdesk technician or support representative assigned to process any tasks requested of the entity during the interaction. In another example, the user may be an employee or technician associated with the entity responding to a third party data security threat. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

Furthermore, as used herein the term "user computer system" or "user device" may refer to any device that employs a processor and memory and can perform computing functions, such as a personal computer or a mobile device, wherein a mobile device is any mobile communication device, such as a cellular telecommunications device (i.e., a cell phone or mobile phone), personal digital assistant (PDA), a mobile Internet accessing device, or other mobile device. Other types of mobile devices may include portable digital assistants (PDAs), pagers, wearable devices, mobile televisions, gaming devices, laptop computers, cameras, video recorders, audio/video player, radio, global positioning system (GPS) devices, or any combination of the aforementioned. In some embodiments, a user device may refer to an entity's computer system, platform, servers, databases, networked devices, or the like. The user device may be used by the user to access the system directly or through an application, online portal, internet browser, virtual private network, or other connection channel. The user device may be a computer device within a network of connected computer devices that share one or more network storage locations.

As used herein, the term "resource" may be used to refer to elements of one or more computing devices, networks, or the like available to be used in the execution of tasks or processes. A resource may include processor, memory, or network bandwidth and/or power used for the execution of tasks or processes. A resource may be used to refer to available processing, memory, and/or network bandwidth and/or power of an individual computing device as well a plurality of computing devices that may operate as a collective for the execution of one or more tasks (e.g., one or more computing devices operating in unison or nodes of a distributed computing cluster).

In accordance with embodiments of the invention, the term "entity" may be used to include any organization or collection of users that may interact with the data integration and threat assessment system. An entity may refer to a business, company, or other organization that either maintains or operates the system or requests use and accesses the system. The terms "financial institution" and "financial entity" may be used to include any organization that processes financial transactions including, but not limited to, banks, credit unions, savings and loan associations, investment companies, stock brokerages, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

"Authentication information" is any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing device, or the like to access, write, delete, copy, or modify data within at least a portion of the system.

To "monitor" is to watch, observe, or check something for a special purpose over a period of time. The "monitoring" may occur periodically over the period of time, or the monitoring may occur continuously over the period of time. In some embodiments, a system may actively monitor a database or data archive, wherein the system reaches out to the database and watches, observes, or checks the database for changes, updates, and the like. In other embodiments, a system may passively monitor a database, wherein the database provides information to the system and the system then watches, observes, or checks the provided information. In some embodiments a system, application, and/or module (such as the robotic process automation module and/or the entity platform described herein) may monitor a user input into the system. In further embodiments, the system may store said user input during an interaction in order to substantially replicate said user input at another time.

As used herein, a "connection" or an "interaction" may refer to any communication between one or more users, one or more entities or institutions, and/or one or more devices, nodes, clusters, or systems within the system environment described herein. For example, an interaction may refer to a transfer of data between systems or devices, an accessing of stored data by one or more devices, a transmission of a requested task, a reporting and correction of an error, or the like. In another example, an interaction may refer to a user interaction with a user device through a user interface in order to connect or communicate with an entity and/or entity system to complete an operation (e.g., request a transfer of funds from an account, complete a form, or the like).

The present invention leverages a two-component system to detect third party security threats and drive processes and security controls by triggering response based on the detection of security threats. The first component of the system is a security threat assessment engine, which identifies and/or receives external and internal data regarding third parties in order to determine information security threats posed by third parties (e.g., the third parties themselves, the operations of the third parties, the applications provided by the third parties to the entity, or the systems provided by the third parties that are utilized by the entity). Based on the external and internal data, the security threat assessment engine may determine security threats, security threat information, and/or a security threat level. The second component of the system is an analytics engine, which may comprise a machine learning component which is configured to detect threat patterns and anomalies. In response to the detection of the threat patterns and anomalies the security threat assessment engine may be modified in order to more accurately determine security threats, security threat information, and/or provide a security threat level for various third parties.

It should be understood that the present invention improves traditional security threat systems by not only utilizing internal data regarding applications and/or systems of third-parties, but also by accessing external data from outside data sources in order to supplement the internal data that is available to the entity. The combination of the internal and external data is utilized to more accurately identify potential security threats of a third-party that may supply products to the entity. Moreover, the determination of the security threats helps the entity to determine plans for mitigating and/or eliminating the security threats by implementing security controls. Furthermore, continuous monitoring of the security threats (e.g., based on continuous monitoring of the external and/or internal data) allows the entity to make decisions regarding how to mitigate potential incidents and/or whether or not to take specific actions with respect to third-parties. The present invention allows for real-time management of security threats and implementation of security controls in order to prevent potential incidents (e.g., misappropriation of data by compromising entities, loss of confidential information, or the like). The present invention is an improvement over traditional systems because of the use of the external data, and the real-time monitoring of the security threats, which results in more accurate determination of security threats and more efficient mitigation of such security threats.

It should be further understood that changes in the external data and internal data, as well as the resulting changes in the security threats, may be monitored over time in order to improve upon the accuracy of the determination of the security threats. For example, the monitoring may allow for the determination of patterns in the accuracy of identifying security threats that results in the reduction of the occurrence of incidents. Moreover, the monitoring may help to determine patterns in the correlation between the individual assessment inquires related to the security threats with the actual incidents in order to determine if the right assessment inquiries are being made and the right security controls are being implemented. Correlations may be further made between collected or archived historical data trends and current data collected and compared in real-time to determine potentially threatening anomalies.

In response to a security threat such as a compromised data or information, the system automatically terminates a data flow or migration between an entity system and the assessed third party system associated with the third party connection by automatically discontinuing a previously established communication link over a network. The terminated connection can be reevaluated and approved by the entity before being reestablished. Furthermore, the system may remove potentially comprised data from a third party system upon detecting and/or confirming a data breach or other security threat. Entity data from the third party system may be extracted before requesting or instructing the third party system to delete the data in order to prevent further exposure and reduce potential damages.

FIG. 1 provides a block diagram illustrating a data integration and threat assessment system and environment 1, in accordance with an embodiment of the invention. As illustrated in FIG. 1, one or more entity systems 10 are operatively coupled, via a network 2, to one or more user computer systems 20, one or more third party systems 30, one or more external data source systems 40 and/or one or more other systems 50. In this way, third parties may be analyzed for security threats using both external and internal data, and, in response, actions may be automatically triggered to counteract detected anomalies or oscillations in the monitored data, as will be described throughout the disclosure.

The one or more entity systems 10 may allow associated users 4 to perform information security threat assessments of third parties (e.g., the third parties themselves, third party systems, and/or third-party applications), receive and respond to actionable alerts related to potential data security threats based on data anomalies, and/or utilize analytics and machine learning related to the information security threat assessments to improve upon the information security threat assessments. The one or more entity systems 10 may allow for the performance of these tasks through communication with the one or more user computer systems 20, the one or more third-party systems 30, the one or more external data source systems 40, and/or the one or more other systems 50 through the network 2. The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more entity systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the one or more user systems 20, the one or more third-party systems 30, the one or more external data source systems 40, and/or the one or more other systems 50. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the one or more entity systems 10 comprise computer-readable instructions 18 stored in the memory component 16, which in one embodiment includes the computer-readable instructions 18 of the one or more entity applications 17 (e.g., website applications, dedicated applications, internal applications, or the like). In some embodiments, the one or more memory components 16 include one or more data stores 19 for storing data related to the one or more entity systems 10, including, but not limited to, data created, accessed, and/or used by the one or more entity applications 17. The one or more entity applications 17 may be utilized to identify internal data of third-parties, capture external data from one or more external data sources, perform security threat assessments on the third parties, and utilize analytics to improve upon the security threat assessments.

As illustrated in FIG. 1, one or more user computer systems 20 are utilized by users 4 to access the one or more entity systems 10, the one or more third-party systems 30, the one or more external data source systems 40, and/or one or more other systems 50 to facilitate users 4 reviewing the information security threats of third parties and/or the analytics associated therewith. Furthermore, the user computer systems 20 may allow the user 4 to take action and respond to detected security threats. The one or more user computer systems 20 may generally comprise one or more communication components 22, one or more processing components 24, and one or more memory components 26. The one or more processing components 24 may include functionality to operate one or more software programs based on computer-readable instructions 28 thereof, which may be stored in the one or more memory components 26.

The one or more processing components 24 are operatively coupled to the one or more communication components 22 and the one or more memory components 26. The one or more processing components 24 use the one or more communication components 22 to communicate with the network 2 and other components on the network 2, such as, but not limited to, the one or more entity systems 10, the one or more third-party systems 30, the one or more external data sources 40, and/or the one or more other systems 50. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components may include a keypad, keyboard, touch-screen, touchpad, microphone, mouse, joystick, other pointer component, button, soft key, and/or other input/output component(s) for communicating with the other systems.

As illustrated in FIG. 1, the one or more user computer systems 20 may have computer-readable instructions 28 stored in the one or more memory components 26, which in one embodiment includes the computer-readable instructions 28 for one or more user applications 27, such as dedicated applications (e.g., apps, applet, or the like), portions of dedicated applications, websites, or other apps that allow the users 4 to take various actions, including allowing the users 4 to access applications located on other systems, or the like, to perform steps and/or review the results of the processes discussed herein. In some embodiments, the one or more users 4 utilize the one or more user computer systems 20 to communicate with the one or more entity systems 10, the one or more third-party systems 30, and/or the one or more external data source systems 40 in order to allow the one or more users 4 to determine information security threats of third-parties, determine analytics thereof utilizing a security threat assessment engine and/or an analytics engine, and/or respond to detected potential security threats.

As illustrated in FIG. 1, one or more third-party systems 30 may communicate with the one or more entity systems 10, the one or more user computer systems 20, the one or more external data source systems 40, and/or the one or more other systems 50 in order allow for access to external assessment information. As such, the one or more third-party systems 30 are operatively coupled, via a network 2, to the one or more entity systems 10, the one or more user computer systems 20, the one or more external data source systems 40, and/or the one or more other systems 50. The one or more third-party systems 30 generally comprise one or more communication components 32, one or more processing components 34, and one or more memory components 36. The one or more processing components 34 are operatively coupled to the one or more communication components 32, and the one or more memory components 36. The one or more processing components 34 use the one or more communication components 32 to communicate with the network 2 and other components on the network 2, such as, but not limited to, the components of the one or more entity systems 10, the one or more user computer systems 20, the one or more external data source systems 40, and/or the one or more other systems 50. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more third-party systems 30 may have computer-readable instructions 38 stored in the one or more memory components 36, which in one embodiment includes the computer-readable instructions 38 of one or more third-party applications 37, such as dedicated applications (e.g., apps, applet, or the like), portions of dedicated applications, websites, or other apps that allow for communication with the one or more users 4 and/or the one or more entities regarding the services (e.g., applications, systems, or the like) that the third-parties may provide to the one or more entities, as will be described herein. It should be understood, when third-party is used herein, unless otherwise specified, the third party may include the third party itself, the systems and applications offered by the third-party, the systems or applications utilized by the third party, and/or other third party information.

Moreover, as illustrated in FIG. 1, the one or more external data source systems 40 and/or the one or more other systems 50 may be operatively coupled to the one or more entity systems 10, the one or more user computer systems 20, and/or the one or more third-party systems 30, through the network 2. The one or more external data source systems 40 and/or the one or more other systems 50 have components the same as or similar to the components described with respect to the one or more entity systems 10, the one or more user computer systems 20, and/or the one or more third-party systems 30 (e.g., one or more communication components, one or more processing components, and one or more memory devices with computer-readable instructions of one or more applications, one or more datastores, or the like). The one or more external data source systems 40 may provide external data, such as security threat information, third party assessment data, third party security threat levels, or the like to the one or more entities to aid in providing data for the security threat assessment conducted by the entity. Thus, the one or more external data source systems 40 and/or the one or more other systems 50 communicate with the one or more entity systems 10, the one or more user computer systems 20, and/or the one or more third-party systems 30 in same or similar way as previously described with respect to the one or more entity systems 10, the one or more user computer systems 20, and/or the one or more third-party systems 30.

A security threat engine is developed by the entity in order to assess security threats of third parties, such as the third party products (e.g., goods and services) that the entity utilizes from the third parties within the systems and/or applications of the entity. For example, the entity may utilize processes, systems, and/or applications of the third party (e.g., that the third party hosts or that are provided to the entity for installation), such as applications (e.g., programs, processes, or the like) and/or systems (e.g., storage, devices, components, or the like), which may or may not have access to and/or store confidential information (e.g., user information, business information, monetary information, or the like) of the entity and/or customers of the entity. In some instances the entity may utilize thousands of products from various third-parties. The security threat assessment engine is developed to identify potential security threats, such as by identifying particular security threats associated with a third party (e.g., individual third party security threats) and/or determining one or more security threat levels for the third-party (e.g., an overall assessment of the security threat of the third party), as will be described in further detail herein.

FIG. 2 provides a high level process flow for triggering security threat responses based on data monitoring, in accordance with embodiments of the invention. As illustrated in blocks 202 and 204 of FIG. 2, the system initially pulls, extracts or receives internal data from one or more internal data sources and external data from one or more external data sources, respectively, for the third party connection. As illustrated, in FIG. 4 the security threat assessment engine 140 may be developed based on external data 110 it receives from external sources (e.g., an external data source system 40) and/or internal data 120 it captures from within the entity systems 10, in order to identify one or more security threats from each of the third parties. As illustrated by block 130 in FIG. 4, which illustrates a flow of information to and from the security threat assessment engine and the analytics engine, in accordance with embodiments of the invention, the external data 110 and the internal data 120 may be received through one or more APIs 130, which allows the external data source systems 40 and/or the entity systems 10, and the applications and systems associated therewith, to interact with the information threat assessment engine 140 and/or the analytics engine 150, through different systems and/or applications. The security threat assessment engine 140 and/or the analytics engine 150 may be utilized to develop and deploy third party information security controls through an information threat security platform 160 and/or to improve entity decisioning in an entity decisioning platform 170.

It should be understood that the external data 110 may include different types of external third party threat data, such as open source threat data 112, cloud threat data 114, and threat intelligence data 116, or the like. The open source threat data 112 (e.g., open source intelligence ("OSINT") data) may include various data that is monitored by an external data source. For example, the open source data may be a summary threat level of third-parties based on the information that the external data source has on the third-parties. The open source data 112 may be based on a category type of the third-parties (e.g., type of business in which the third-party is involved), such as the products that the third parties offer and the information to which the third-parties have access. The open source data 112 may further include remediation data, such as the how are potential threats dealt with by the third-party. The cloud threat data 114 (e.g., a cloud access security broker ("CASB") data) may be similar to the type of data associated with the open source threat data 112, but it may be specific to data related to the cloud services that the third parties may utilize. As such, the cloud threat data 114 may include summary security threat levels of the third parties for the cloud related activities, a category type associated with the cloud related activities, and/or remediation data associated with the cloud related activities. The open source threat data 112 and cloud threat data 114 may be identified and utilized separately because different entities may provide the associated products and each may have different security threats associated therewith.

The external data 110 may also include threat intelligence data 116, which may relate to publicly available information, such as news, trade information, or other publicly accessed information that may indicate potential security threats associated with particular third-parties.

It should be understood that the external data 110 received from the external data source systems 40 may be information to which the one or more entities currently do not have access. For example, the external data source systems 40 may monitor communications over the Internet with the third-parties, and thus, the external data source systems 40 may monitor the number of communications with the third-parties, the type of communications, and/or the requests within the communications (e.g., required authentication, number of authentication factors, such as one, two, three, or the like). Additionally, the external data sources may have access to other information regarding incidents, assessments, or the like that the entity does not have, and thus, may provide a different view of the security threats associated with the third-parties. Moreover, different external data sources may have different information about third-parties, and thus, it may be beneficial to access external data 110 from different external data sources. For example, one external data source may define one third-party as having a security threat level that is low, while another external data source may define the same third-party as having a security threat level that is high because it has access to incident data that the first party many not have.

The internal data 120 may include incident management data 112, which is related to any incidents that may be associated with a system and/or application provided by the third-party that is utilized by the entity (e.g., hosted by the third-party and/or hosted by the entity). For example, the incident may be an actual security event, such as misappropriated data, exposure of confidential information, successful unauthorized access by another party (e.g., not the third-party and not the entity), or other like incident that could have resulted in an actual security event (e.g., unsuccessful unauthorized access attempt, or the like). The internal data 120 may further include application and/or system data 124, which is related to the operation and/or use of the applications and/or systems of the third parties. For example, the application and/or system data 124 may include how the application and/or system is utilized within the entity, such as what information does is store (e.g., anonymous information, personal information), how the application and/or system operates (e.g., how the information is stored, how a user accesses the information), what other applications and/or systems communicate with the third-party applications and/or systems (e.g., how many different ways is the information accessed and/or distributed). The internal data 120 may further include assessment data 126, which relates to different types of assessments that were performed on the third-party (e.g., the third-party itself, the third party processes, the third party applications, and/or the third party systems). Different types of assessments may include self-assessments provided by the third-party to the entity, online assessments provided by the entity to the third-party, and/or onsite assessments for which a user 4 associated with the entity travels to the third-party to review the third party processes, its applications, and/or its systems. The assessment data 126 may further include a frequency of assessments indicating how often a third party should be assessed and what type of assessment should be used (e.g., onsite assessment once a year and online assessments three times a year, or the like).

Returning now back to FIG. 2, as illustrated in block 206, the system generates a threat level for the third party connection based on the internal data and the external data for the third party connection. It should be understood that a threat level generation may occur at any time. For example, the request for generating a threat level or security threat may be received pre-interaction with the third party, such as before entering into an agreement with the third party in order to determine any potential security threats before entering the agreement with the third party. The request may also occur post-interaction with the third party, such as after signing the agreement with the third party in order to identify potential security threats that should be monitored during implementation and/or operation of the systems and/or applications provided by the third party. The request may also occur pre-assessment scheduling, such as before an assessment is scheduled in order to determine potential security threats which may help to determine the type of assessment (e.g., self, online, in person, or the like), when the assessment should occur, as well as to give some insight to users 4 (e.g., assessors, or the like) regarding on what to concentrate the review during an assessment. Alternatively, the request may occur during post-assessment support, such as after the assessment occurs in order to try to match any assessment findings with security threats identified using the information threat assessment engine 140. The request may also occur during remediation support, such as in order to aid in identifying security threats to remediate, and/or determine if such remediation has reduced the security threats. In other embodiments, the request may occur at any time to determine if a user 4 (e.g., assessor, or the like) has any gaps in assessments over the lifecycle of the user's assessments. In some embodiments, the request may occur before business decisions are made in order to determine security threat levels that may aid in making the business decisions. It should be further understood that the request can be made whenever a user wants to determine a security threat level for any third party at any time. In some embodiments the security threat level may be determined automatically and continuously in real-time, or automatically at particular intervals (e.g., daily, weekly, monthly) in order identify any changes in the information security threats over time.

After a request to determine security threats and generate a threat level for a third party is received, external data 110 is received and internal data 120 is accessed. The external data 110, as previously described above, is received from more or more external data sources. The external data 110 may be related to the third party and may include potential individual security threats (e.g., specific threats that the external source knows about), a security threat level (e.g., as determined by an external data source), a third party category type (e.g., may determine scrutiny of third party assessments), a third party category level (e.g., relative threat with other third parties), remediation (e.g., how easily the security threats may be remediated), channel scope (e.g., how the third party applications and/or systems are accessed), or the like as previously discussed herein.

The internal data 120, as previously described herein, is accessed from within the entity systems. The internal data 120 is related to the third party and may include internal assessment data (e.g., assessment type, assessment scope, specific assessment inquires, specific assessment responses, or the like), incident details (e.g., third party application or system vulnerability, incident details, incident frequency, incident severity level, or the like), third-party procurement findings (e.g., findings from internal procurement of products from third parties), remediation (e.g., recovery time, recovery objective, potential workarounds, or the like), or the like.

The security threat levels are determined based on the external data and the internal data using the information security threat engine 140. In some embodiments, the security threats may include individual security threats that are provided by the external data 110 and/or internal data 120. These may include specific threats that are explicitly provided by the external data source or identified by the assessors. Alternatively, specific security threats may not have been identified, but instead can be inferred from a combination of the external and/or internal data. For example, no incidents have occurred within the entity, but the external data may indicate that other parties may have had incidents for a particular application and/or system utilized by the entity. Moreover, in some embodiments an information security threat level is determined in order to identify a security threat level for a plurality of third parties in order to allow the entity to prioritize the development or editing of the security threat plans for the most significant third party threats.

The security threats to the third party may include, but are not limited to, potential access to confidential information of the entity (i.e., a data breach), potential significant downtime for the applications and/or systems, potential loss of entity data (e.g., confidential entity data and/or customer information), or other like security threats which will be discussed in further detail herein. Moreover, not only may the security threats be identified, but the security threat assessment engine 140 may also determine the potential frequency of the security threats, the vulnerability of the applications and/or systems (e.g., different levels for the security threats), the frequency of potential losses that might occur due to the occurrence of a loss event that results from the security threats (e.g., one-time loss, ongoing loss, or the like), the magnitude of the potential loss due to the occurrence of a loss event that results from the security threats (e.g., small financial losses, large financial losses, loss of goodwill of the entity name, loss of the ability to operate, or the like), or the like, one or more of which may be utilized in order to determine a total potential exposure to the entity of the security threat should a loss event occur.

At block 208 of FIG. 2, the system monitors the previously generated threat level to determine a change in the threat level. The security threat assessment engine 140 is utilized to automatically, and continuously or intermittently, monitor security threats by analyzing the security threats of third parties on an ongoing basis. As such, the external data 110 and the internal data 120 may be monitored in real time, or intermittently, in order to determine any changes in any of the external data 110 and/or the internal data 120. When any changes in the data occur, the security threat assessment engine 140 may automatically determine any changes in security threats (e.g., determine potential individual security threats, an updated security threat level, or the like). Current data may be compared to stored or archived historical data to determine a change or level of change of a threat level. Additionally, or alternatively, if the analytics engine 150 determines that the security threat assessment engine 140 needs updating, the security threat assessment engine 140 may be updated and/or the security threats re-evaluated using the updated security threat assessment engine 140 (e.g., regardless of whether or not the external and/or internal data changes) in order to more accurately identify updated security threats (e.g., an updated security threat level for a third party).

In some embodiments it should be understood that the determination of a particular security threat, determining a change in a threat level, determining that the third party has reached a specific security threat level, and/or verification of the occurrence of an incident related to a security threat may result in automatically preventing the use of applications and/or systems, or portions thereof, associated with a third party. For example, when a particular application and/or system of a third party has an incident, which may result in a loss event, and/or a security threat level (e.g., as determined by the security threat assessment engine 140) reaches a particular level (e.g., predetermined threshold level), use or access of the affected application and/or system, or portions thereof, may be automatically prevented until the incident can be investigated. In some embodiments of the invention, if the use of, or access to, the application and/or systems cannot be prevent (e.g., it is a necessary application and/or system), the application and/or system may be monitored more closely after the occurrence of an incident, an identification of a security threat, and/or a reaching a particular security threat level.

As previously discussed above, a determined change in the threat level triggers a response by the system to a detected threat. For example, a threat level exceeding a predetermined threshold level may trigger a response from the system. In another example, a threat level may increase by an amount exceeding a predetermined safe amount. In this example, even though the total threat level may not yet be above the threshold, the amount that the threat level increased is still significant enough to warrant a response. In this way, they system may identify and address potential threats as they are forming and preemptively address said threats to minimize damages. As previously discussed, in yet another example the content of collected external data, such as the content of an Internet communications by the third party may be identified by the system and trigger a response.

At block 210 of FIG. 2, based on determining a change in the threat level, the system triggers transmission of an actionable alert to a user system. The actionable alert may comprise a series of one or more computer instructions to one or more of the system described herein to instruct components of said one or more systems to perform operations in response to the threat. The actionable alert may further comprise message or notification transmitted to a user of the system (e.g., a technician or threat assessment team) notifying the user of the detected threat while providing details of the threat and actions automatically taken by the system along with actions that may be taken by the user through interaction with the interactive alert itself or otherwise through the user device. The system may further generate and transmit a threat assessment report, wherein the threat assessment report displays current and historical information associated with the third party connection in real-time and details the detected threat and actions automatically performed by the system and/or available to be taken by the user. The threat assessment report may present the threat or error to the user in a format that intuitively presents the problem to the user such as a drill down graphic user interface (GUI), wherein the user may interact with the GUI to view threat details and perform additional actions in response to the threat, such as those response actions described herein.

FIG. 3 provides a high level process flow for placing a hold on a third party connection based on a determined security threat, in accordance with one embodiment of the invention. After initially pulling internal and external data and generating a threat level similar to the initial steps of FIG. 2, At block 302 of FIG. 3, the system determines a change in the threat level indicative of a third party connection leak of confidential information of the entity as a result of, for example, a data breach, a software error, a hacking event, a cyber-attack, or the like, wherein secure information (e.g., account numbers, usernames and passwords, social security numbers, proprietary files or documents, or the like) has been compromised by the third party.

At block 304 of FIG. 3, in response to the specific embodiment above, the system places an automatic hold on the third party connection between a third party system and an entity system in an effort to minimize further damages and lessen the extent of the third party data breach. The connection or relationship with the third party may be limited, frozen, or terminated in response to the breach.

In one embodiment, the entity may have an agreement with the third party, wherein the third party may store data or information associated with the entity on the third party systems (e.g., a server provider) and data is regularly transmitted or migrated over a communication channel from the entity systems to the third party systems for storage. In response to the breach, the system may automatically terminate an existing data migration between the third party systems and the entity systems by terminating a previously established operative communication channel (e.g., over the network) between the two parties. The system may further revoke third party access to data associated with the entity. The system may quarantine and monitor authentication credentials associated with the third party connection and/or one or more authentication credentials associated with the data breach (e.g., user account credentials included in the data breach) until the threat has been resolved. For example, the system may quarantine and monitor customer user accounts included in the breached entity data maintained by the third party until it can be assured that the included accounts and associated data are secure.

Communication channels and access to data by the third party may be reestablished and reinstated, respectively, once the threat has been eliminated. Access to data may be reinstated automatically once threat level falls below a predetermined threshold. In this way, the hold placed on the third party connection may be a precautionary, temporary hold lasting only as long as a threat remains. In other embodiments, data access may not be automatically reinstated even after the threat level returns below the predetermined threshold. In this case, an appropriate representative of the entity (e.g., a manager, supervisor, or the like) is required to provide authentication credentials and manually reinstate the data access to the third party system. Additionally, terminated connection channels can be reevaluated and approved by the entity before being reestablished.

At block 306 of FIG. 3, the system extracts entity data that is at least partially stored on the third party system in response to determining the change in the threat level. In order to minimize or limit damages to the entity, the system may trigger a data migration or data recovery from the third party systems to the entity systems in response to the increased threat level indicative of a data breach. The system may remove potentially comprised data from the third party systems upon detecting the data breach or other security threat. In one embodiment, the system may further request that the third party delete the data following successful data migration from the third party systems in order to prevent further data compromise and reduce further potential damages. In another embodiment, the system may transmit a command to instruct the third party system to delete the entity data following a successful data migration from the third party systems.

In some embodiments, the entity system and or other systems may be in communication with a third party system as illustrated in the system environment 1 of FIG. 1. The third party may be an outside vendor, service provider, or the like associated with the entity and/or the user, wherein products, services, and/or data may be request or required from the third party by the user and/or the entity. The system may establish a third party communication channel with the third party system to access said products, services, and/or data. In some embodiments, the system may integrate the third party communication channel within the entity platform to present the user with a unified third party communication channel presented within the entity platform. In this way, the system may continue a user interaction requiring third party involvement while retaining the user within the entity platform.

In some embodiments of the invention one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems or devices described herein.

Moreover, it should be understood that the process flows described herein include transforming the information sent and/or received from the applications of the different systems (e.g., internally or externally) and/or the devices from one or more data formats into a data format associated with the application for display to the user on the user device. There are many ways in which information is converted within the system environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may converting to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be performed in an order other that the order illustrated, may be combined or divided, or may be performed simultaneously. It will also be understood that the blocks of the block diagrams illustrated, in some embodiments, are merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 15/827,094 published as U.S. Patent Publication No. 2019/0166154 | SYSTEM FOR INFORMATION SECURITY THREAT ASSESSMENT BASED ON DATA HISTORY | Concurrently herewith |
| 15/827,292 published as U.S. Patent Publication No. 2019/0166155 | SYSTEM FOR GENERATING A COMMUNICATION PATHWAY FOR THIRD PARTY VULNERABILITY MANAGEMENT | Concurrently herewith |
| 15/826,979 published as U.S. Patent Publication No. 2019/0166153 | INFORMATION SECURITY VULNERABILITY ASSESSMENT SYSTEM | Concurrently herewith |
| 15/826,893 published as U.S. Patent Publication No. 2019/0166152 | SYSTEM FOR INFORMATION SECURITY THREAT ASSESSMENT | Concurrently herewith |
| 15/827,034 published as U.S. Patent Publication No. 2019/0163914 | SYSTEM FOR INFORMATION SECURITY THREAT ASSESSMENT AND EVENT TRIGGERING | Concurrently herewith |
| 15/827,097 published as U.S. Patent Publication No. 2019/0163915 | SYSTEM FOR RECURRING INFORMATION SECURITY THREAT ASSESSMENT | Concurrently herewith |

The invention claimed is:

1. A data integration and threat assessment system for triggering analysis of connection oscillations to improve data and connection security, the system comprising:
   a memory;
   a communication circuitry in communication with one or more external data sources via a network; and
   a hardware processor operatively coupled to the memory and the communication circuitry, wherein the hardware processor is configured to:
   pull internal data for a third party connection from one or more internal data sources;
   pull external data for the third party connection from the one or more external data sources;
   generate a threat level for the third party connection based on the internal data and the external data for the third party connection;
   monitor the threat level to determine a change in the threat level;
   based on determining the change in the threat level, trigger transmission of an actionable alert to a user system; and
   automatically extract entity data at least partially stored on a third party system in response to determining the change in the threat level, wherein the entity data at least partially stored on the third party system is migrated from the third party system to an entity system.

2. The system of claim 1 further comprising automatically placing a hold on the third party connection between a third party system and the entity system.

3. The system of claim 2, wherein placing the hold on the third party connection further comprises terminating the data migration between the third party system and the entity system, wherein an operative communication channel between the third party system and the entity system is terminated.

4. The system of claim 2, wherein placing the hold on the third party connection further comprises revoking access to entity data by the third party system.

5. The system of claim 4, wherein access to entity data by a third party system is reinstated based on the threat level falling below a predetermined value.

6. The system of claim 2, wherein placing the hold on the third party connection is executed in response to detecting a cyber-attack on the third party system.

7. The system of claim 1, wherein determining the change in the threat level further comprises the threat level exceeding a predetermined value, wherein the transmission of the actionable alert is triggered upon the predetermined value being exceeded threat level passing a threshold to trigger.

8. The system of claim 1, wherein determining a change in the threat level further comprising identifying one or more anomalies associated with the third party connection, wherein the one or more anomalies are based on historical data associated with the third party connection.

9. The system of claim 8, wherein current data and the historical data are displayed to a user in real time.

10. The system of claim 1, wherein determining the change in the threat level is based on determining a change in at least one of the internal data and the external data.

11. The system of claim 1, wherein the threat level is regularly updated based on current internal data and external data for the third party connection.

12. The system of claim 11, wherein the threat level is updated daily based on changes in the internal data and external data for the third party connection.

13. The system of claim 1, wherein triggering the transmission of the actionable alert to the entity system further comprises generating a threat assessment report, wherein the threat assessment report displays current and historical information associated with the third party connection in real-time.

14. The system of claim 13, wherein the threat assessment report further comprises a drill down graphic user interface.

15. The system of claim 1, wherein the actionable alert is transmitted to an assessment team associated with an entity responding to the change in the threat level.

16. A computer program product for data integration and threat assessment for triggering analysis of connection oscillations to improve data and connection security, the computer program product comprising at least one non-transitory computer-readable medium having computer-readable program code portions embodied therein, the computer-readable program code portions comprising:
   an executable portion configured for pulling internal data for a third party connection from one or more internal data sources;
   an executable portion configured for pulling external data for the third party connection from one or more external data sources;
   an executable portion configured for generating a threat level for the third party connection based on the internal data and the external data for the third party connection;
   an executable portion configured for monitoring the threat level to determine a change in the threat level;
   an executable portion configured for based on determining a change in the threat level, triggering transmission of an actionable alert to a user system; and
   an executable portion configured for automatically extracting entity data at least partially stored on a third party system in response to determining the change in the threat level, wherein the entity data at least partially stored on the third party system is migrated from the third party system to an entity system.

17. The computer program product of claim 16 further comprising placing a hold on the third party connection between a third party system and the entity system.

18. The computer program product of claim 17, wherein placing the hold on the third party connection further comprises terminating the data migration between a third party system and the entity system, wherein an operative communication channel between the third party system and the entity system is terminated.

19. A computer-implemented method for data integration and threat assessment for triggering analysis of connection oscillations to improve data and connection security, the method comprising:
   pulling internal data for a third party connection from one or more internal data sources;
   pulling external data for the third party connection from one or more external data sources;
   generating a threat level for the third party connection based on the internal data and the external data for the third party connection;
   monitoring the threat level to determine a change in the threat level;
   based on determining a change in the threat level, triggering transmission of an actionable alert to a user system; and automatically extracting entity data at least partially stored on a third party system in response to determining the change in the threat level, wherein the entity data at least partially stored on the third party system is migrated from the third party system to an entity system.

* * * * *